United States Patent
Griffith

(10) Patent No.: US 10,777,175 B1
(45) Date of Patent: Sep. 15, 2020

(54) MOUNTING APPARATUS FOR SECURING A MUSICAL INSTRUMENT TO A BLEACHER

(71) Applicant: Adam Michael Griffith, Cave Creek, AZ (US)

(72) Inventor: Adam Michael Griffith, Cave Creek, AZ (US)

( * ) Notice: Subject to any disclaimer, the term of this patent is extended or adjusted under 35 U.S.C. 154(b) by 0 days.

(21) Appl. No.: 16/689,896

(22) Filed: Nov. 20, 2019

Related U.S. Application Data

(60) Provisional application No. 62/770,042, filed on Nov. 20, 2018.

(51) Int. Cl.
*G10G 5/00* (2006.01)
*F16M 11/22* (2006.01)

(52) U.S. Cl.
CPC ............. *G10G 5/005* (2013.01); *F16M 11/22* (2013.01)

(58) Field of Classification Search
CPC ................................ G10G 5/005; F16M 11/22
See application file for complete search history.

(56) References Cited

U.S. PATENT DOCUMENTS

| 6,281,417 B1 * | 8/2001 | Ladao | A47F 7/0035 |
| | | | 211/85.6 |
| 8,016,253 B1 * | 9/2011 | Yu | F16M 11/28 |
| | | | 248/161 |

* cited by examiner

*Primary Examiner* — Kimberly R Lockett
(74) *Attorney, Agent, or Firm* — Plager Schack LLP; Mark H. Plager; Eric Liou

(57) ABSTRACT

A mounting apparatus that secures a musical instrument to a bench of a bleacher is provided. The apparatus includes a base member having an elongated member connected to a lower plate, a support peg coupled to the elongated member of the base member and designed to support the musical instrument thereon, a leg slidably mounted to the internal cavity of the elongated member of the base member, and a pair of arms pivotably mounted to the lower plate of the base member. The apparatus is disposed on the bench and the leg slidably adjusts relative to the base member to an engaged position with the leg in contact with the front face of the bench. The pair of arms pivotably adjusts to an engaged locking position with the legs in contact with the rear face of the bench, thereby enabling the apparatus to secure the musical instrument on the bleacher.

11 Claims, 4 Drawing Sheets

MOUNTING APPARATUS FOR SECURING A MUSICAL INSTRUMENT TO A BLEACHER

RELATED APPLICATION

The application claims priority to provisional patent application U.S. Ser. No. 62/770,042 filed on Nov. 20, 2018, the entire contents of which is herein incorporated by reference.

BACKGROUND

The embodiments herein relate generally to musical instruments. More specifically, embodiments of the invention are directed to a mounting apparatus for use to secure a musical instrument to a bleacher in a supported position.

A marching band plays a wide variety of instruments at sporting events such as football games. These instruments include, but are not limited to, brass instruments such as trumpets, trombones, tubas and French horns, woodwind instruments such as flutes, oboes, saxophones and clarinets, and a variety of percussion instruments. These instruments are expensive, with many instruments worth several thousands of dollars. During the course of a sporting event, these musical instruments are often knocked over or stepped on in the bleachers or stands when left unattended, thereby resulting in expensive repairs for the owners of the instruments.

As such, there is a need in the industry for a mounting apparatus for use with a musical instrument that addresses the limitations of the prior art, which effectively secures the musical instrument in a supported position to the bleacher or bench. There is a further need for the mounting apparatus to support the musical instrument in a secured position on the floor.

SUMMARY

In certain embodiments of the invention, a mounting apparatus configured to secure a musical instrument to a bench of a bleacher in a supported position is provided. The mounting apparatus comprises a base member comprising an elongated member continuously connected to a lower plate, the elongated member comprising an internal cavity, a support peg coupled to the elongated member of the base member and configured to permit attachment of the musical instrument thereon, a leg slidably mounted to the internal cavity of the elongated member of the base member, and a pair of arms pivotably mounted to the lower plate of the base member, each arm in the pair of arms configured to pivotably adjust to one of a plurality of locking positions, wherein the base member is disposed on the top face of the bench of the bleacher and the leg is configured to slidably adjust relative to the elongated member of the base member to an engaged position with the leg in contact with the front face of the bench, wherein the pair of arms is configured to pivotably adjust to an engaged locking position with the pair of legs in contact with the rear face of the bench, thereby enabling the apparatus to secure the musical instrument in the supported position on the bench of the bleacher. In one embodiment, an upper plate is coupled to the base member and comprises a central opening that allows the support peg to extend therethrough.

BRIEF DESCRIPTION OF THE FIGURES

The detailed description of some embodiments of the invention will be made below with reference to the accompanying figures, wherein the figures disclose one or more embodiments of the present invention.

DETAILED DESCRIPTION OF CERTAIN EMBODIMENTS

Figure 1:
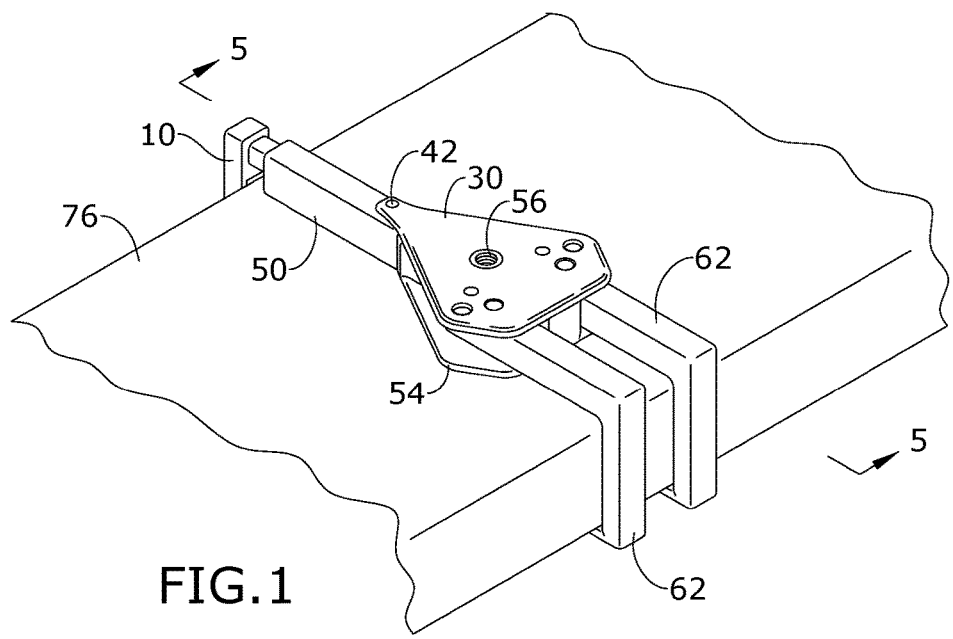
FIG. 1 depicts a perspective view of certain embodiments of the mounting apparatus shown in use.
Figure 2:
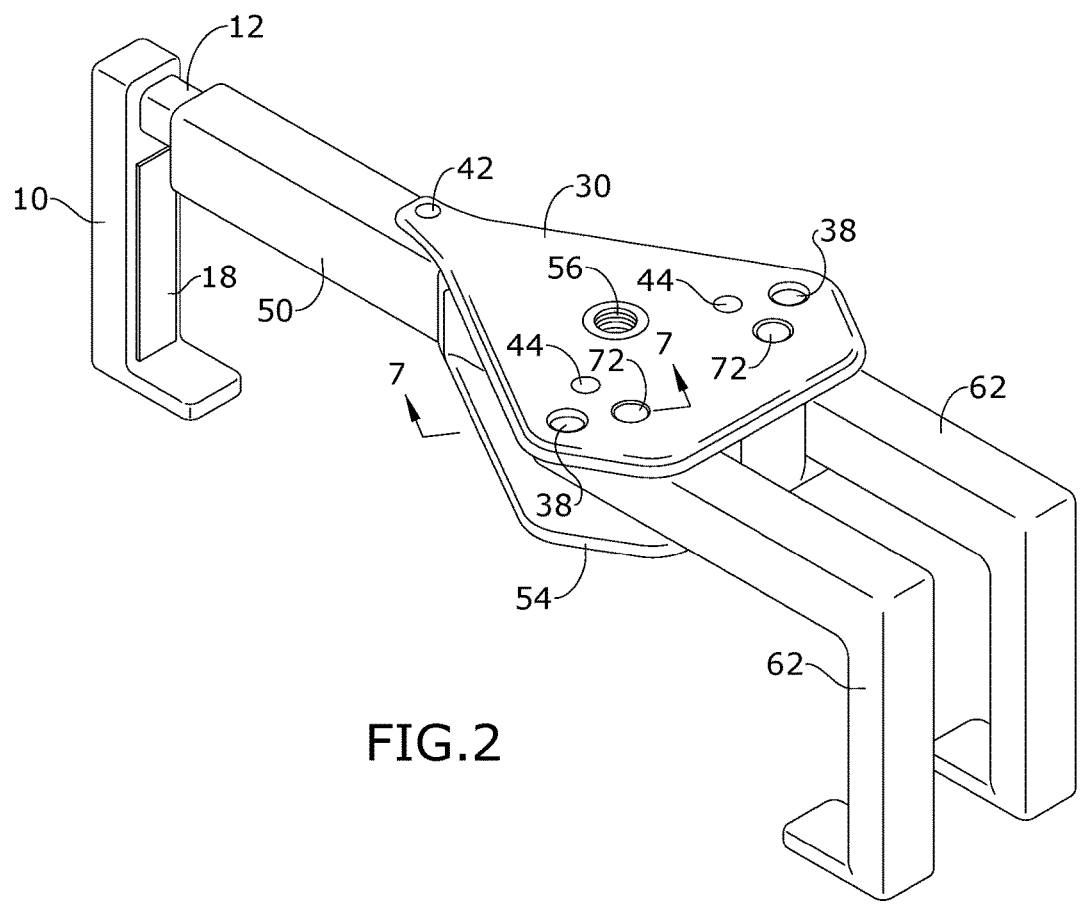
FIG. 2 depicts a perspective view of certain embodiments of the mounting apparatus.
Figure 3:
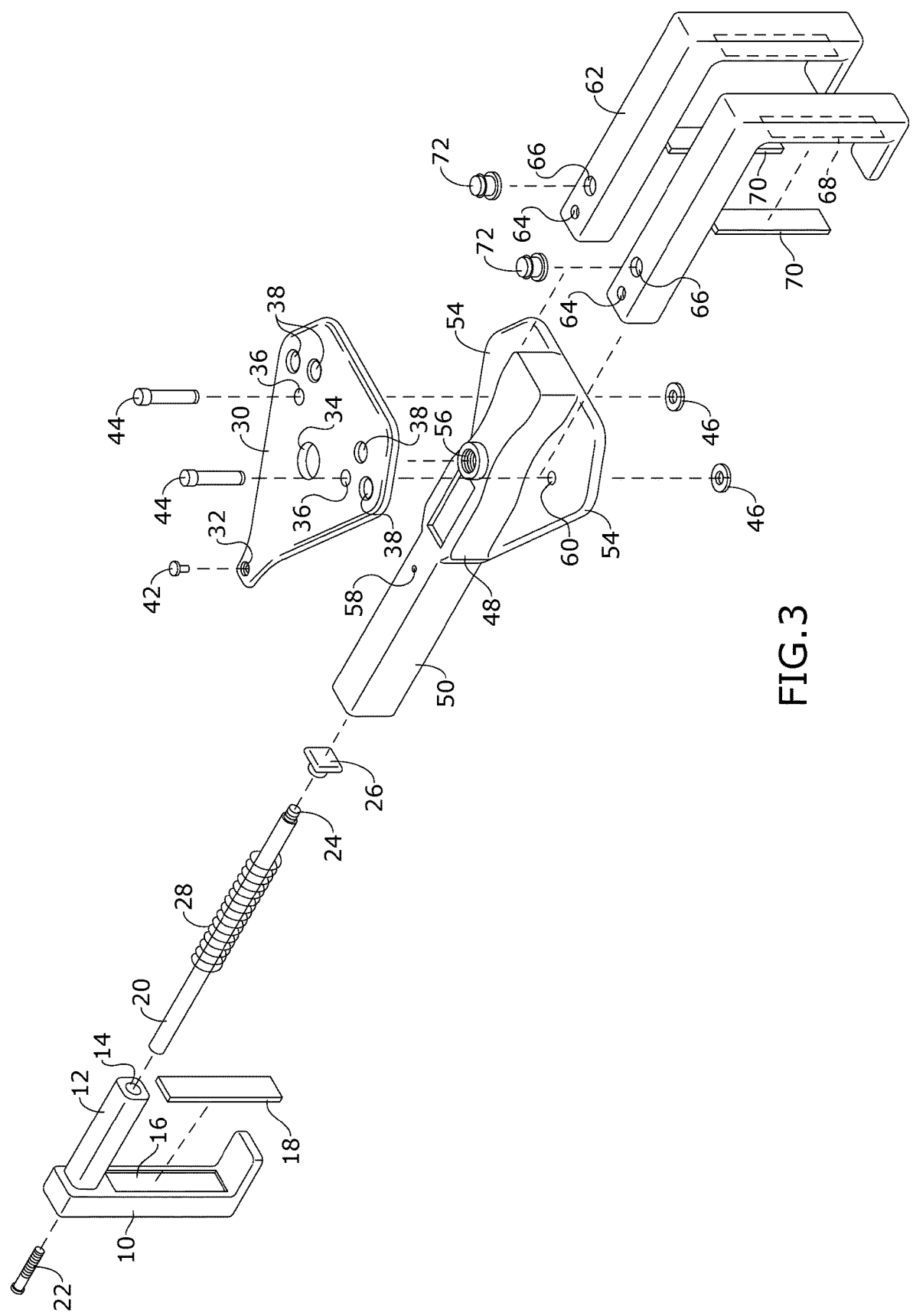
FIG. 3 depicts an exploded view of certain embodiments of the mounting apparatus.
Figure 8:
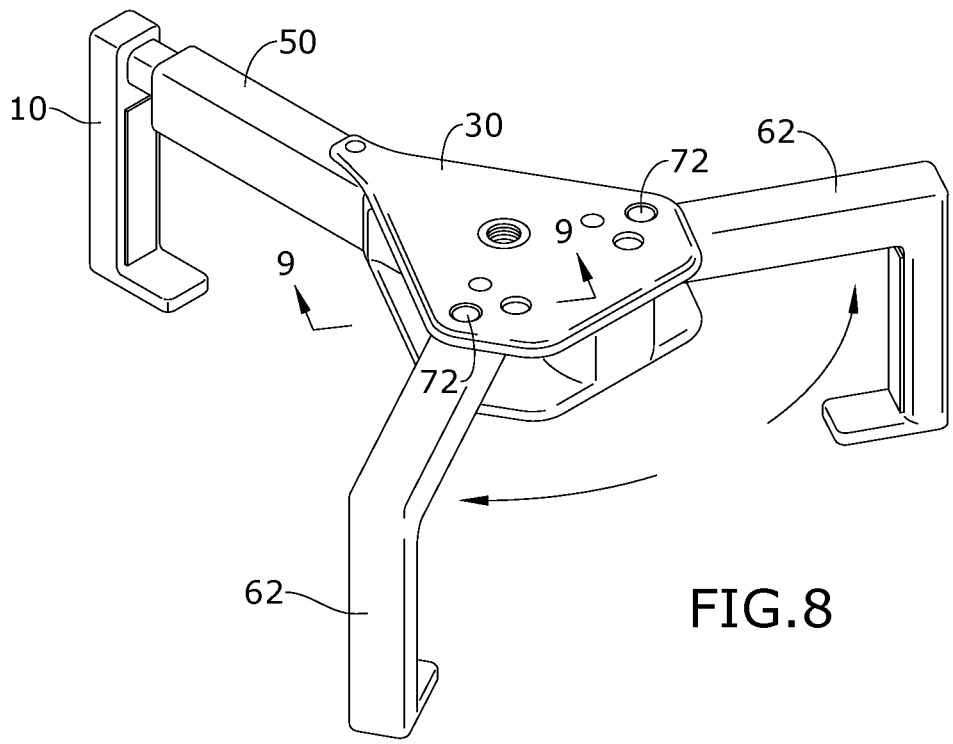
FIG. 8 depicts a perspective view of certain embodiments of the mounting apparatus illustrating the pivotal movement of arms 62.

In certain embodiments as depicted in FIGS. 1-3, the mounting apparatus is configured to secure a musical instrument (not shown) to bleacher bench 76. The musical instrument may include, but is not limited to, brass instruments such as trumpets, trombones, tubas and French horns, woodwind instruments such as flutes, oboes, saxophones and clarinets, and a variety of percussion instruments. In an alternative embodiment as depicted in FIG. 8, the mounting apparatus can serve as a platform to support the musical instrument on the ground.

In certain embodiments as depicted in FIGS. 1-3, the mounting apparatus generally comprises leg 10, rod 20, spring plate 26, spring 28, upper plate 30, base 48, and a pair of arms 62. In one embodiment, the components of the mounting apparatus are made from aluminum. However, it shall be appreciated that the components of the mounting apparatus can be made from any alternative materials known in the field including, but not limited to, other metals, plastic, rubber, wood, and the like.

Figure 4:
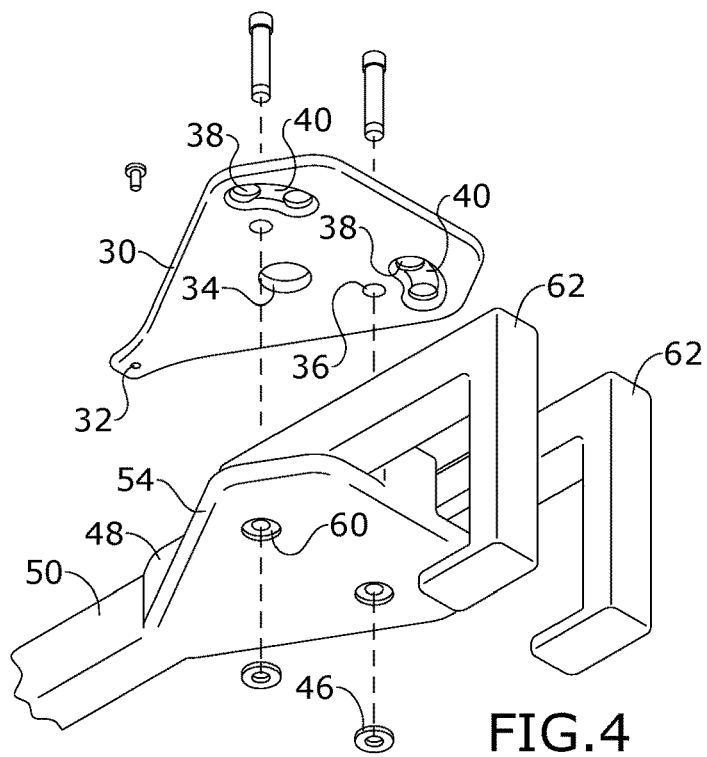
FIG. 4 depicts a bottom exploded view of certain embodiments of the mounting apparatus.
Figure 5:
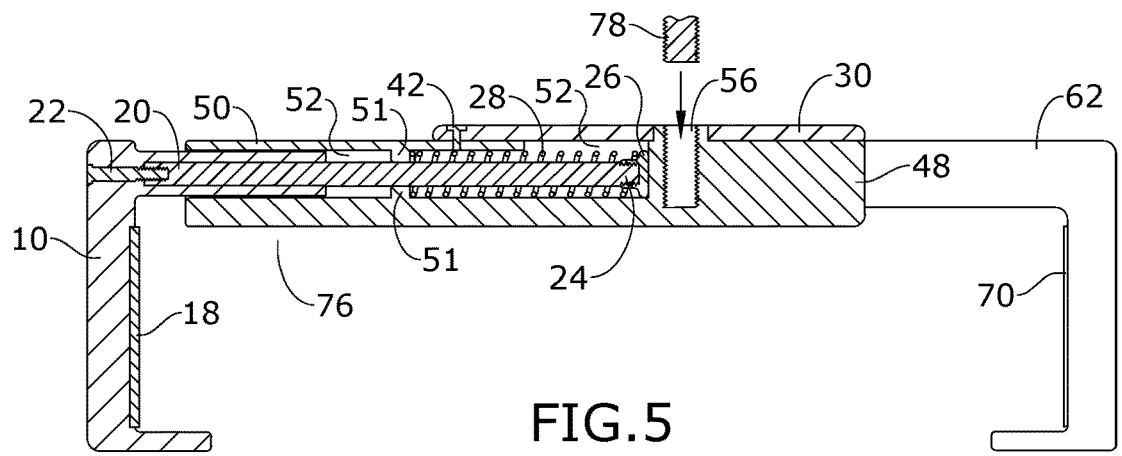
FIG. 5 depicts a section view of certain embodiments of the mounting apparatus taken along line 5-5 in FIG. 1, illustrating the insertion of instrument support peg 78 on base 48.

In one embodiment as depicted in FIGS. 3-5, base 48 comprises elongated member 50 continuously connected to lower plate 54. Elongated member 50 comprises internal cavity 52 and internal tab 51 coupled to the side wall along internal cavity 52. In one embodiment as depicted in FIG. 3, the top surface of elongated member 50 comprises front peg slot 58 and instrument peg opening 56. In one embodiment as depicted in FIGS. 3-4, lower plate 54 of base 48 comprises a pair of pivot peg slots 60.

In one embodiment as depicted in FIGS. 2-3 and 5, leg 10 is slidably mounted to internal cavity 52 of elongated member 50 of base 48. In one embodiment, leg 10 comprises a generally L-shaped member having post 12, rod opening 14 and leg pad recess 16. Leg pad 18 is coupled to leg pad recess 16 of leg 10 by an adhesive or alternative fastening component. In one embodiment, leg pad 18 is preferably made from rubber or any alternative cushion member such as foam or other resilient and/or deformable materials.

In one embodiment, leg 10 is slidably mounted to base 48 by rod 20, spring plate 26 and spring 28. As depicted in FIGS. 3 and 5, rod 20 comprises a first end coupled to leg 10 by bolt 22 and a second threaded end 24 coupled to spring plate 26 inside internal cavity 52 of base 48. Spring 28 is disposed around rod 20. In the assembled embodiment as depicted in FIG. 5, rod 20 extends through internal cavity 52 of elongated member 50 of base 48 and post 12 of leg 10. Spring 28 is secured around rod 20 and comprises a first end in contact with internal tab 51 of elongated member 50 and a second end in contact with spring plate 26.

Figure 6:
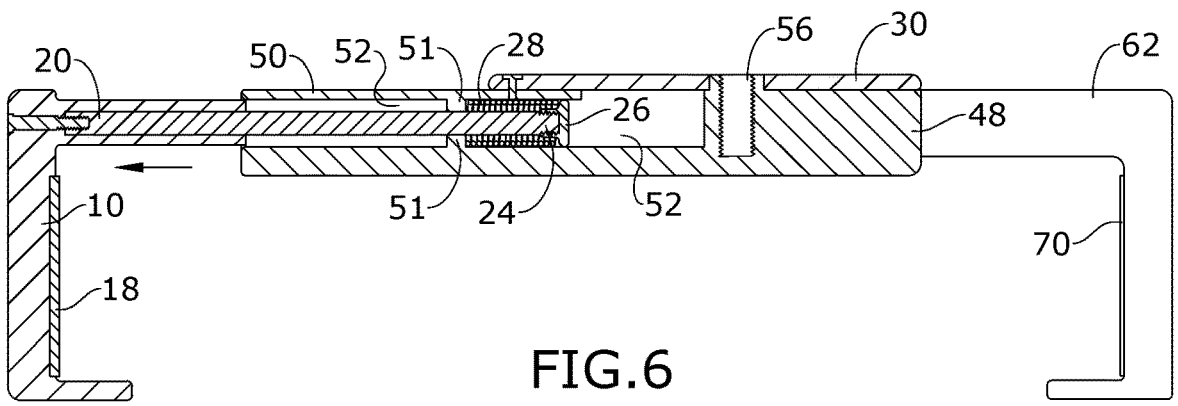
FIG. 6 depicts a section view of certain embodiments of the mounting apparatus.

In one embodiment as depicted in FIG. 6, sliding movement of leg 10 away from base 48 as illustrated by the arrow in the figure compresses spring 28 between internal tab 51 and spring plate 26. This compression of spring 28 creates a return force in the spring that opposes the sliding movement of leg 10 in extension. The release of leg 10 allows the return force in spring 28 to retract leg 10 within elongated member 50 of base 48 as depicted in FIG. 5.

In certain embodiments as depicted in FIGS. 2-5, upper plate 30 is coupled to base 48 and comprises a plurality of openings including front peg opening 32, central opening 34, a pair of pivot openings 36 and a plurality of locking openings 38. In one embodiment as depicted in FIG. 4, each adjacent pair of locking openings 38 is connected together by connecting slot 40. Front peg 42 is disposed through front peg opening 32 in upper plate 30 and front peg slot 58 of base 48 to secure upper plate 30 and base 48 together. However, it shall be appreciated that additional pegs or alternative fastening components can be used to secure upper plate 30 and base 48 together in alternative embodiments.

In one embodiment as depicted in FIGS. 1-3 and 5, instrument peg opening 56 of base 48 aligns with central opening 34 of upper plate 30 when base 48 and upper plate 30 are coupled together. This allows instrument support peg 78 to insert through central opening 34 of upper plate 30 and instrument peg opening 56 of base 48. The exposed portion of instrument support peg 78 above upper plate 30 serves as an attachment point for the musical instrument. In one embodiment, instrument support peg 78 comprises a threaded portion that engages with internal threads in instrument peg opening 56 of base 48. It shall be appreciated that instrument support peg 78 can be connected to instrument peg opening 56 using a snap friction fit connection instead or another fastening mechanism in alternative embodiments.

In certain embodiments as depicted in FIGS. 2-4 and 7-9, a pair of arms 62 is pivotably mounted to both upper plate 30 and lower plate 54 of base 48. In one embodiment, each arm 62 comprises a generally L-shaped member comprising pivot peg hole 64, adjustment peg hole 66 and arm pad recess 68. Arm pad 70 is coupled to arm pad recess 68 in each arm 62 by an adhesive or alternative fastening component. In one embodiment, arm pad 70 is preferably made from rubber or any alternative cushion member such as foam or other resilient and/or deformable materials.

As depicted in FIGS. 3-4, each arm 62 is pivotably mounted to upper plate 30 and base 48 by pivot peg 44, which extends through one of the pair of pivot openings 36 in upper plate 30, pivot peg hole 64 in arm 62, and one of the pair of pivot peg slots 60 in base 48. As depicted in FIG. 4, the bottom end of pivot peg 44 is coupled to fastener 46, which sits within pivot peg slot 60 of lower plate 54 of base 48.

Figure 7:
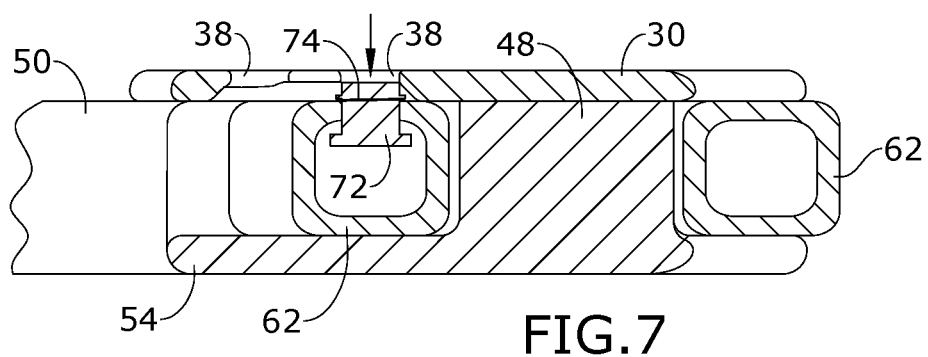
FIG. 7 depicts a section view of certain embodiments of the mounting apparatus taken along line 7-7 in FIG. 2.
Figure 9:
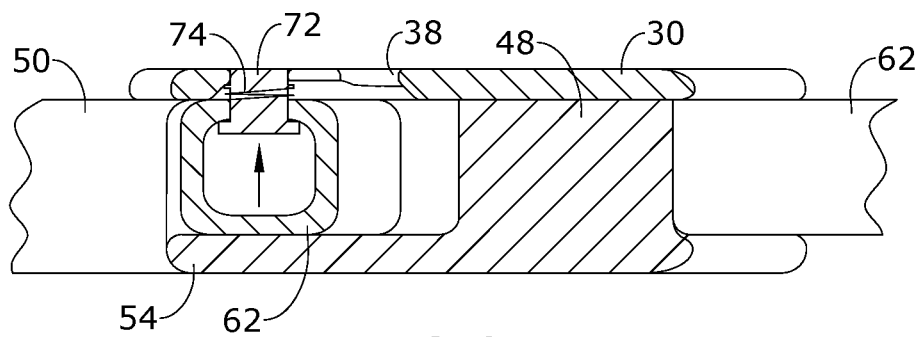
FIG. 9 depicts a section view of certain embodiments of the mounting apparatus taken along line 9-9 in FIG. 8.

In one embodiment as depicted in FIGS. 3 and 7-9, adjustment peg 72 is disposed in adjustment peg hole 66 in each arm 62. As depicted in FIGS. 7 and 9, adjustment peg 72 is spring-loaded by peg spring 74. Peg spring 74 is disposed around adjustment peg 72. Each arm 62 can be pivotably adjusted relative to upper plate 30 and base 48 by depressing adjustment peg 72 as depicted in FIG. 7. This compresses peg spring 74 and retracts adjustment peg 72 to allow pivotal movement of arm 62 relative to both upper plate 30 and base 48. Arm 62 is configured to pivotably adjust until adjustment peg 72 is aligned with any locking opening 38 in upper plate 30. During this alignment, peg spring 74 applies an upward return force that pushes adjustment peg 72 up to engage with the aligned locking opening 38 in upper plate 30. In this engaged locking position, arm 62 is secured and cannot pivotably adjust relative to upper plate 30 and base 48. In certain embodiments as depicted in FIGS. 2 and 8, the pair of arms 62 can pivotably adjust to different locking configurations.

In operation, instrument support peg 78 is inserted through central opening 34 of upper plate 30 and instrument peg opening 56 of base 48. The pair of arms 62 is manually adjusted to the engaged locking position with arms 62 oriented generally parallel to leg 10 as depicted in FIG. 2. The mounting apparatus is secured to bleacher bench 76. The apparatus is maneuvered so that base 48 sits on the top face of bleacher bench 76 and the pair of arms 62 is directly in contact with the top, rear and bottom faces of bleacher bench 76 as depicted in FIG. 1. In this position, arm pads 70 of arms 62 contact the rear face of bleacher bench 76. Leg 10 is slidably adjusted away from base 48 so that it directly contacts the front and bottom faces of bleacher bench 76. The return force in spring 28 retracts leg 10 toward base 48 so that leg pad 18 is firmly pressed against the front face of bleacher bench 76.

The musical instrument is coupled to the exposed portion of instrument support peg 78 above upper plate 30. In this position, the mounting apparatus serves as a stable platform that secures the musical instrument in a supported position on bleacher bench 76. To remove the mounting apparatus from bleacher bench 76, leg 10 is slidably adjusted away from base 48 to permit detachment of the mounting apparatus from bleacher bench 76.

In an alternative embodiment, the mounting apparatus can serve as a platform to support the musical instrument on the ground. In this embodiment, the pair of arms 62 is pivotably adjusted to an alternative locking position as depicted in FIG. 8. The mounting apparatus is disposed on the ground and the musical instrument is coupled to instrument support peg 78 as previously described.

It shall be appreciated that the components of the mounting apparatus described in several embodiments herein may comprise any alternative known materials in the field and be of any color, size and/or dimensions. It shall be appreciated that the components of the mounting apparatus described herein may be manufactured and assembled using any known techniques in the field. In an alternative embodiment, the mounting apparatus can have other components and a variable number of plates, legs, arms, holes, openings, slots, and the like.

Persons of ordinary skill in the art may appreciate that numerous design configurations may be possible to enjoy the functional benefits of the inventive systems. Thus, given the wide variety of configurations and arrangements of embodiments of the present invention, the scope of the invention is reflected by the breadth of the claims below rather than narrowed by the embodiments described above.

What is claimed is:

1. A mounting apparatus configured to secure a musical instrument to a bench of a bleacher in a supported position, the bench comprising a top face, a bottom face, a front face connecting the top and bottom faces together, and a rear face connecting the top and bottom faces together, the mounting apparatus comprising:
- a base member comprising an elongated member continuously connected to a lower plate, the elongated member comprising an internal cavity;
- a support peg coupled to the elongated member of the base member and configured to permit attachment of the musical instrument thereon;
- a leg slidably mounted to the internal cavity of the elongated member of the base member; and
- a pair of arms pivotably mounted to the lower plate of the base member, each arm in the pair of arms configured to pivotably adjust to one of a plurality of locking positions;
- wherein the base member is disposed on the top face of the bench of the bleacher and the leg is configured to slidably adjust relative to the elongated member of the base member to an engaged position with the leg in contact with the front face of the bench, wherein the pair of arms is configured to pivotably adjust to an engaged locking position with the pair of legs in contact with the rear face of the bench, thereby enabling the apparatus to secure the musical instrument in the supported position on the bench of the bleacher.

2. The mounting apparatus of claim 1, further comprising an upper plate coupled to the base member and comprising a central opening that allows the support peg to extend therethrough and a plurality of locking openings.

3. The mounting apparatus of claim 2, further comprising a spring-loaded adjustment peg coupled to each arm in the pair of arms, the spring-loaded adjustment peg configured to retract to permit pivotal movement of the arm relative to the upper and lower plates and extend to engage with one of the plurality of locking openings in the upper plate.

4. The mounting apparatus of claim 3, wherein the pair of spring-loaded adjustment pegs engages with a corresponding pair of locking openings in the plurality of locking openings in the upper plate when the pair of arms is in the engaged locking position.

5. The mounting apparatus of claim 4, further comprising a rod comprising a first end coupled to the leg and a second end coupled to a spring plate disposed in the internal cavity of the elongated member of the base member.

6. The mounting apparatus of claim 5, further comprising a spring disposed around the rod and comprising a first end in contact with an internal tab in the internal cavity of the base member and a second end in contact with the spring plate, wherein sliding movement of the leg in extension relative to the elongated member of the base member compresses the spring to generate a return force in the spring that opposes the sliding movement of the leg.

7. The mounting apparatus of claim 6, wherein the leg contacts the bottom face of the bench and each arm in the pair of arms contacts the bottom face of the bench.

8. The mounting apparatus of claim 7, further comprising a first pad coupled to the leg and in contact with the front face of the bench, a second pad coupled to the first arm in the pair of arms and in contact with the rear face of the bench, and a third pad coupled to the second arm in the pair of arms and in contact with the rear face of the bench.

9. The mounting apparatus of claim 8, further comprising a pair of pivot pegs connecting the upper plate and the lower plate of the base member together.

10. The mounting apparatus of claim 9, wherein the leg comprises a post that partially extends around the rod.

11. A mounting apparatus configured to secure a musical instrument to a bench of a bleacher in a supported position, the bench comprising a top face, a bottom face, a front face connecting the top and bottom faces together, and a rear face connecting the top and bottom faces together, the mounting apparatus comprising:
- a base member;
- a support peg coupled to the base member and configured to permit attachment of the musical instrument thereon;
- a leg slidably mounted to the base member; and
- a pair of arms pivotably mounted to the base member, each arm in the pair of arms configured to pivotably adjust to one of a plurality of locking positions;
- wherein the base member is disposed on the top face of the bench of the bleacher and the leg is configured to slidably adjust relative to the base member to an engaged position with the leg in contact with the front face of the bench, wherein the pair of arms is configured to pivotably adjust to an engaged locking position with the pair of legs in contact with the rear face of the bench, thereby enabling the apparatus to secure the musical instrument in the supported position on the bench of the bleacher.

* * * * *